United States Patent [19]

Bierman et al.

[11] 4,447,403

[45] May 8, 1984

[54] METHOD FOR AUTOCLAVE OXIDATION OF ION SPECIES AQUEOUS SOLUTIONS

[75] Inventors: Laurence W. Bierman; Gary L. Long; David Bortner, all of Pocatello, Id.

[73] Assignee: J. R. Simplot Company, Boise, Id.

[21] Appl. No.: 72,304

[22] Filed: Sep. 4, 1979

[51] Int. Cl.$^3$ .............................................. C01G 43/00
[52] U.S. Cl. ........................................ 423/20; 423/18; 423/320
[58] Field of Search ...................... 423/17, 20, 18, 320

[56] References Cited

U.S. PATENT DOCUMENTS

| | | | |
|---|---|---|---|
| 2,979,378 | 4/1961 | Koble | 423/17 |
| 3,017,241 | 1/1962 | McLean | 423/17 |
| 3,711,591 | 1/1973 | Hurst et al. | 423/10 |
| 4,277,454 | 7/1981 | Long et al. | 423/18 |

FOREIGN PATENT DOCUMENTS 2001611  2/1979  United Kingdom .................. 423/20

OTHER PUBLICATIONS

Gaudon et al., "Intl. Conf. on Peaceful Uses of Atomic Energy", vol. 8, pp. 8-9, 18-22, 28, 32-36 (1955.
Clegg et al., "Uranium Ore Processing", pp. 125-127 and 283, Addison-Wesley Publ. Co., Inc. (1958) Reading, Mass., U.S.A.

*Primary Examiner*—Edward A. Miller
*Attorney, Agent, or Firm*—Fulwider, Patton, Rieber, Lee & Utecht

[57] ABSTRACT

An improved method and apparatus for effecting a substantial reduction in retention time of oxidation processes by the autoclave oxidation of ion species dissolved in aqueous solutions. In one embodiment, the invention provides for oxidation of dissolved reduced ion species including ferrous iron ($Fe^{+2}$), uranium ($U^{+4}$) and vanadium ($V^{+3}$) from wet process phosphoric acids, or for conditioning of aqueous solutions for other uses, such as corrosion control, by raising the valence state of dissolved ion species. In accordance with the present invention, pure oxygen, present in quantity of at least 94% by volume, is utilized as an oxidizing agent with specified process parameters: temperature, pressure and mixing conditions in an autoclave reaction vessel. In a presently preferred embodiment, the following specified parameters have achieved optimum results with regard to a significant decrease of retention time of the aqueous solution treated in the autoclave vessel: temperature range of from about 120° F. to about 160° F., pressure range of from about 120 psi to about 150 psi and effecting agitation by the use of an impeller located near the interface of the liquid and gas mixture in the vessel to provide a dispersion of the liquid solution in the gaseous phase. In accordance with such embodiment, a reduction of retention time for oxidation of uranium ($U^{+4} \rightarrow U^{+6}$) and vanadium ($V^{+3} \rightarrow V^{+4}$) metals from wet process phosphoric acid has been found to be less than two minutes, whereas, prior processes for effecting the same oxidation results have taken at least one hour.

16 Claims, No Drawings

METHOD FOR AUTOCLAVE OXIDATION OF ION SPECIES AQUEOUS SOLUTIONS

BACKGROUND OF THE INVENTION

This invention relates to a method and apparatus for oxidation of ion species in aqueous solutions, including wet process phosphoric acid and leaching liquors, to provide for recovery of dissolved materials such as iron, vanadium, uranium and copper or to condition the aqueous solution for other uses. Such conditioning includes elevation of the valence state of certain dissolved ion species such as ferrous iron ($Fe^{+2} \rightarrow Fe^{+3}$), uranium ($U^{+4} \rightarrow U^{+6}$) and vanadium ($V^{+3} \rightarrow V^{+4}$) among others, for a multitude of purposes, such as corrosion control and metal recovery.

In this respect, phosphoric acid is commercially produced by one of two methods; "furnace" or "wet process". In the "wet process" method, the phosphate ore is contacted with a mineral acid, such as sulfuric, to extract phosphate values. In the process many other metallic compounds present in the ore are also dissolved by the acid and remain in the phosphoric solution. In the solvent extraction of some metals such as vanadium or uranium from the acid or as a reduction in acid corrosivity it is necessary to raise the valence states of these and other metals. The raising of these ion valence states is called oxidation.

The process of oxidation is physically possible using a variety of oxidants including air, ozone and other various chemical oxidants. However, in practice it may take several hours to achieve significant oxidation of these dissolved materials with air and most other chemical oxidants under normal processing conditions can add substantial costs to the recovery or conditioning process.

The present invention provides for the use of pure oxygen as an oxidant, in conjunction with specified process parameters: pressure, temperature and mixing conditions, achieving efficient oxidation of desired metals, in one embodiment, in less than 2 minutes. Accordingly, the present invention significantly reduces the oxidation process time in as much as about two orders of magnitude from prior known air or oxygen oxidation processes.

One such known process involves the recovery of uranium as a by-product from wet process phosphoric acid disclosed in U.S. Pat. No. 3,835,214 entitled Oxidative Stripping process for the Recovery of Uranium from Wet-Process Phosphoric Acid, issued to Hurst and Crouse, on Sept. 10, 1974. In the Hurst process, uranium is oxidized with an oxidizing agent which can either be oxygen or ozone gas. However, the disclosed process did not recognize the significant effect of certain process parameters and apparatus as discovered by the present invention.

A further oxidation process concerned with the recovery of uranium and vanadium from aqueous wet process phosphoric acid is disclosed in U.S. Pat. No. 3,836,476, entitled Simultaneous Recovery of Vanadium and Uranium from Oxidized Wet Process Acid, issued to Baldwin, et al on Sept. 17, 1974. The Baldwin disclosure indicates the possibility of using oxygen as the oxidizing agent, but, also fails to recognize the significance of specified reaction conditions, and significant impact regarding reduction of retention time necessary for the oxidation process.

Other patents which disclose recovery of various materials from acid solutions by oxidation include U.S. Pat. No. 2,211,119, entitled Method of Recovery of Vanadium from Acid Solutions issued to Hixson, et al. on Aug. 13, 1940; U.S. Pat. No. 2,830,872, entitled Recovery of Uranium Values from Phosphate Rock, issued to Bailes et al. on Nov. 4, 1958; and U.S. Pat. No. 2,926,992, entitled Process for Recovery of Uranium Values, issued to Stedman on Mar. 1, 1960. Although each of these disclosures discusses the recovery of certain materials from acid solutions, they are only of general interest in light of the present invention in that they fail to recognize the significant improvement achieved by the present invention over the use of conventional oxidants and process conditions.

The improved method and apparatus of the present invention therefore provides the use of pure oxygen as an oxidant at specified process parameters including pressure, temperature and mixing conditions to thereby significantly decrease the process time that is needed to oxidize dissolved materials as by-products from aqueous solutions or to condition the solution for other uses by raising the valence state of certain dissolved materials therein.

SUMMARY OF THE INVENTION

The present invention significantly improves the efficiency of oxidation processes by the autoclave oxidation of ion species in aqueous solutions. Accordingly, the present invention provides a method and apparatus for oxidizing dissolved reduced ion species in aqueous solutions, especially acid solutions, including wet process phosphoric acid and leaching solutions, for recovery of such oxidized species or to condition the aqueous solution for other uses such as corrosion control, by raising the valence state of the dissolved ion species, or to promote the solubility of certain elements, such as uranium, into the acid or leaching solutions.

Briefly, and in general terms, the method and apparatus of the present invention utilizes pure oxygen as an oxidant, in conjunction with certain specified process parameters: temperature, pressure, and mixing conditions in the reaction vessel to effect a significant reduction in process time (retention time) compared with prior oxidation processes.

In more detail, an applicable temperature range for autoclave oxidation in accordance with the invention is from about 80° F. to about 170° F. In this respect, while higher reaction vessel temperatures are operable, they have not been determined to produce a substantial reduction with regard to process time. Further, an applicable oxygen pressure range for autoclave oxidation is from about 100 psi to about 160 psi. Similarly as with the foregoing specified temperature range, while higher oxygen pressures are operable, they have not been determined to produce a substantial reduction with regard to process time. The treated aqueous solution should have sufficient agitation in the vessel, accomplished by any known means to supply good surface contact between the aqueous solution (being treated) and the gaseous oxidation (oxygen) phases.

In a presently preferred embodiment, the following specified parameters have achieved optimum results with regard to a significant decrease of retention time of the aqueous solution treated in the autoclave vessel: temperature range from about 120° F. to about 160° F., pressure range from about 120 psi to about 150 psi and effecting agitation by the use of an impeller located near the interface of the liquid and gas mixture in the vessel to provide a dispersion of the liquid solution in the gaseous phase. In accordance with the one embodiment, a reduction of retention time for oxidation of uranium ($U^{+4} \rightarrow U^{+6}$) and vanadium ($V^{+3} \rightarrow V^{+4}$) metals from wet process phosphoric acid has been found to be less than two minutes, whereas, prior processes for effecting the same oxidation results have taken at least one hour.

Other features and advantages of the present invention will become apparent from the following detailed descriptions, taken in conjunction with the accompanying claims which will illustrate by way of example, the principles of the present invention.

DESCRIPTION OF THE PREFERRED EMBODIMENTS

This invention relates to a method and apparatus for autoclave oxidation of dissolved reduced ion species in aqueous solutions, especially acid solutions, including wet process phosphoric acid and acid or alkaline leaching solutions, containing recoverable or treatable quantities of ion species such as ferrous iron ($Fe^{+2}$), vanadium ($V^{+3}$), uranium ($U^{+4}$) among others. This invention can also be used to promote the further solubility of suspended solids in a solution by oxidizing the ions already in solution.

In one embodiment form, and for purposes of illustration, the method and apparatus of the present invention may be utilized for for the recovery of vanadium and uranium as metal by-products from wet process phosphoric acid without required addition of conventional chemical oxidants. Accordingly, an aqueous solution containing recoverable or treatable quantities of reduced ion species is supplied at a suitable flow rate to a sealed reaction vessel. A pure oxygen source, containing at least 94% by volume $O_2$, is typically supplied at from about 3 lbs. to 8 lbs per 1,000 gallons of solution, as an oxidizer for the reduced ion species in the aqueous solution. The reduced ion species may comprise any material, such as reduced metallic ions having a sufficiently low oxidation potential (electromotive potential) to be oxidized by oxygen. A representative group of such materials having sufficient oxidation potential include ferrous iron ($Fe^{+2} \rightarrow Fe^{+3}$), copper ($Cu^{+} \rightarrow Cu^{+2}$), vanadium ($V^{+3} \rightarrow V^{+4}$) and uranium ($U^{+4} \rightarrow U^{+6}$) among others.

More specifically, the method and apparatus in accordance with the present invention achieves a significant reduction in retention time of about 2 orders of magnitude than has been achieved previously, in the foregoing embodiment, when operated at specified process parameters of temperature, pressure and mixing conditions in an autoclaving environment. The pure oxygen oxidant is fed to the reaction vessel, such as an autoclave or suitable mixing vessel, having sufficient capacity to allow a distinct amount of vapor space and liquid space. The capacity of the reaction vessel is not critical and may range from about 3 gals. to about 2,000 gals. or greater. In this respect, if a 3 gal. sized reaction vessel is used, a suitable typical flow rate of about ½ gal. per minute of aqueous solution to be treated is fed to the vessel. Moreover, if a 2,000 gallon sized reaction vessel is used a typical flow rate of about 500 gallons per minute of aqueous solution to be treated is fed to the vessel.

One suitable reaction vessel is an autoclave having a magnetic stirrer shaft (Magna-Drive shaft commercially available from Autoclave Engineering of Erie, Pa.). Other types of mixers also commercially available provide suitable packing glands or mechanical seals. Other methods of contacting the liquid and gas phases may also be used by those skilled in the art without departing from the scope of the invention.

It is preferable to provide an inlet pipe for the pure oxygen feed near the bottom of the autoclave, beneath the eye of the impeller to provide the gas liquid contact, however, this is not critical to the invention.

In accordance with the present invention, the reaction vessel is operated at a temperature range of from about 80° F. to about 170° F. and preferably between about 120° F. to about 160° F. However, it has been determined that a temperature of greater than 170° F. may be utilized and will still result in an operable embodiment but without a significant decrease in mixture retention time. The reaction vessel is maintained at a pressure range of from about 100 psi to about 160 psi, and preferably within a pressure range of about 120 psi to about 150 psi. However, as with temperature, it has also been determined that the subject process will be operable at above 160 psi but without a significant decrease in mixture retention time.

The aqueous solution to be treated with the pure oxygen oxidant should have sufficient dispersion to supply good surface contact between the liquid and gas phases. In this regard, one preferable means for effecting such dispersion is provision of a 3-inch diameter impeller at the interface of the liquid-gas phases to allow a dispersion of the liquid into the gas phase and a second impeller located lower in the liquid phase to allow good mechanical agitation of the liquid phase.

Typically, when such agitation means is utilized, a rotation of from about 300 rpm to about 600 rpm of the impeller is suitable. It is to be understood that this speed would vary considerably the exact size and geometric design of the autoclave, and can be determined by those skilled in the art.

While foaming of the reaction mixture has not been a problem, particularly with acidic solutions, those skilled in the art will readily appreciate that other additives such as anti-foaming agents, etc. may be incorporated into the aqueous solution to prevent such occurrence.

Removal of the treated aqueous solution from the reaction vessel may be effected by any suitable means such as overflow standpipe or an automatic level controller. In this embodiment, the overflow standpipe is adjustable in height to provide for suitable positioning in conjunction with various liquid levels contained in the reaction vessel at any one time. The outlet terminal of the discharge line must be provided with an adjustable valve capable of reducing high pressurized flow (about 150 psi) of the treated solution to atmospheric pressure such as those commercially available from numerous valve manufacturers.

The foregoing descriptions and the following specific examples are for the purposes of illustration and are not to be considered as limiting the scope of the invention, reference being had to the appended claims for this purpose.

To demonstrate the significant decrease in mixture retention time, a pilot plant was constructed for the oxidation of ferrous iron ($Fe^{+2}$) and vanadium ($V^{+3}$).

EXAMPLE 1

A group of tests were carried out in which wet process phosphoric acid was pumped into a continuous 5 gallon autoclave where pressure was maintained at a constant value with a regulated oxygen supply. Oxygen demand was stoichemetric and an amount required to saturate discharged acid at its respective temperatures and pressure. The acid was pre-heated to different predetermined values, flow and liquid level in the autoclave were varied to produce different residence times.

A sealed shaft agitator was set at different speeds to produce various levels of mixing. The results of these tests appear in the following table:

TABLE I

ACID OXIDATION TESTS

| Test # | Temperature °F. | $O_2$ Pressure psig | Retention Time | Mixer Speed | % Oxidation $Fe^{+2} \rightarrow Fe^{+3}$ | % Oxidation $V^{+3} \rightarrow V^{+4}$ |
|---|---|---|---|---|---|---|
| 1 | 80° F. | 140 psig | 3.2 min. | 550 rpm | 66.6% | 0% |
| 2 | 160 | 140 | 9.5 | 550 | 100 | 85.1 |
| 3 | 160 | 60 | 9.5 | 550 | 100 | 29.3 |
| 4 | 80 | 140 | 9.5 | 200 | 49.4 | 0 |
| 5 | 80 | 60 | 3.2 | 200 | 8.5 | 0 |
| 6 | 160 | 60 | 3.2 | 200 | 2.4 | 0 |
| 7 | 160 | 140 | 1.4 | 200 | 6.4 | 0 |
| 8 | 160 | 140 | 4.3 | 200 | 36.6 | 0 |
| 9 | 80 | 60 | 4.3 | 200 | 12.2 | 0 |
| 10 | 80 | 60 | 4.3 | 550 | 63.8 | 0 |
| 11 | 80 | 140 | 1.4 | 550 | 96.8 | 0 |
| 12 | 160 | 60 | 1.4 | 550 | 77.7 | 0 |
| 13 | 120 | 100 | 3.4 | 390 | 35.9 | 0 |
| 14 | 120 | 100 | 3.4 | 390 | 35.9 | 0 |
| 15 | 120 | 100 | 3.4 | 390 | 32.8 | 0 |
| 16 | 160 | 140 | 17.2 | 550 | 100 | 87.5 |
| 17 | 160 | 140 | 1.4 | 550 | 100 | 72.0 |
| 18 | 160 | 140 | 9.5 | off | 7.8 | 0 |

For simplicity of the calculation and demonstration of the results it was assumed that iron then vanadium were successive stepwise oxidations. Tests using air at atmospheric pressure produced 47% of $Fe^{+2}$ oxidized in 2 hours at 70° F. and 56% oxidized in 2 hours at 165° F.

Tests using pure oxygen at atmospheric pressure produced 77.6% conversion of $Fe^{+2}$ to $Fe^{+3}$ in 40 minutes using seven times the stoichemetric supply of $O_2$.

EXAMPLE 2

Wet process phosphoric acid containing dissolved quantities of $Fe^{+2}$, $U^{+4}$, $V^{+3}$ ion species from a digestion flow circuit is preheated to about 80°–100° F. minimum and preferably to about 140°–160° F. or the reaction vessel can provide for such temperature control. The acid is then injected into a pressure autoclave containing an oxygen atmosphere. Pressure in the autoclave is regulated above 100 psig and above 140 psig if oxidized $V^{+4}$ is to be achieved. Pressures above 200 psig apparently did not significantly aid the process. While in the autoclave the acid is mixed to allow good liquid/gas contact. In this respect, two double impeller, 10 horsepower mixers for 500 gpm of processed acid is used. Other combinations of mixing are obviously available; however, unless adequate gas/liquid contact is provided very poor oxidation will result.

Using the desired operating parameters 100% $Fe^{+3}$ and $U^{+6}$ and greater than 90% $V^{+4}$ oxidation is obtained with less than 2 minutes retention time in the autoclave.

While particular forms of the invention have been illustrated and described it will be apparent to those skilled in the art that various modifications can be made without departing from the spirit and scope of the invention.

We claim:

1. A process for controlling the corrosivity of wet process phosphoric acid solution comprising the steps of:
   (a) flowing the acid solution into a controlled environment reaction vessel having a total volumetric capacity greater than the volume of the acid solution therein;
   (b) flowing oxygen into said vessel in sufficient quantity to substantially oxidize said reduced metal ion species present in the acid solution;
   (c) oxidizing the reduced metal ion species in the acid solution by an autoclave oxidation in said reaction vessel at a temperature selected from within a range of from about 80° F. to about 170° F., at a pressure selected from within a range of from about 100 psi to about 160 psi, and by dispersing the oxygen throughout the acid solution in said reaction vessel;
   (d) said oxidizing and dispersing step being continued for a period of time less than about two minutes to effect substantial oxidation of said reduced metal ion species present in the acid solution; and
   (e) removing the acid solution from the reaction vessel.

2. The process as defined in claim 1, wherein said step of flowing oxygen into said reaction vessel comprises supplying to said vessel a gas containing at least about 94% by volume $O_2$.

3. The process in claim 1, wherein said oxidizing step is performed at a temperature selected from within a range of from about 120° F. to about 160° F.

4. The process as defined in claim 1 wherein said oxidizing step is performed at a pressure selected from within a range of from about 120 psi to about 150 psi.

5. The process as defined in claim 1 wherein said reduced metal ion species is selected from the group consisting of iron, vanadium, uranium and mixtures thereof.

6. The process as defined in claim 1 wherein said step of flowing oxygen into said reaction vessel comprises flowing the oxygen into said reaction vessel at a flow rate of from about 3 lbs. to about 8 lbs per 1,000 gallons of the acid solution.

7. The process as defined in claim 1 wherein said dispersing step is accomplished by rotating an impeller for agitation of the acid solution.

8. The process as defined in claim 7 wherein said impeller is provided at the interface of the acid solution and the oxygen within the reaction vessel.

9. A process for controlling the corrosivity of wet process phosphoric acid solution, comprising the steps of:
  (a) supplying the acid solution into a controlled atmosphere autoclave having a total volumetric capacity greater than the volume of the acid solution therein;
  (b) supplying oxygen into the autoclave in sufficient quantity for substantial oxidization of reduced metal ion species present in the acid solution; and
  (c) oxidizing the reduced metal ion species in the acid solution by dispersing the oxygen throughout the acid solution within the autoclave at a temperature selected from within the range of from about 80° F. to about 170° F. and at a pressure selected from within the range of from about 100 psi to about 160 psi for a period of time less than about two minutes to effect substantial oxidation of the reduced metal ion species in the acid solution.

10. The process of claim 9 wherein said oxygen supplying step comprises supplying to the autoclave a gas having at least about 94% by volume $O_2$.

11. The process of claim 10 wherein said oxygen supplying step further comprises supplying the oxygen at a flow rate of from about 3 lbs. to about 8 lbs. per 1,000 gallons of the acid solution.

12. The process of claim 9 wherein said oxidizing step comprises dispersing the acid at a temperature selected from within the range of about 120° F. to about 160° F., and at a pressure selected from within the range of from about 100 psi to about 150 psi.

13. The process of claim 9 wherein said reduced metal ion species is selected from the group consisting essentially of iron, vanadium, uranium, and mixtures thereof.

14. The process of claim 9 wherein said oxidizing step comprises the steps of dispersing the acid solution and the oxygen with a first impeller positioned at the interface therebetween within the autoclave, and agitating the acid solution with a second impeller positioned within the acid solution.

15. A process for controlling the corrosivity of wet process phosphoric acid solution, comprising the steps of:
  (a) supplying the acid solution into a controlled environment reaction vessel having a total volumetric capacity greater than the volume of the acid solution therein;
  (b) supplying oxygen into the reaction vessel in the form of gas including at least about 94% by volume $O_2$ and in sufficient quantity for substantial oxidation of dissolved reduced metal ion species present in the acid solution;
  (c) oxidizing the reduced metal ion species by dispersing the gas throughout the acid solution within the reaction vessel at a temperature selected from within a range of from about 120° F. to about 160° F. and at a pressure selected from within a range of from about 100 psi to about 150 psi for a period of time less than about two minutes to effect substantial oxidation of the reduced metal ion species in the acid solution.

16. The process of claim 1, 9, or 15 wherein said dispersing step comprises agitating the acid solution and the oxygen with about thirty horsepower of agitation per minute for each one thousand gallons of acid solution.

* * * * *

UNITED STATES PATENT AND TRADEMARK OFFICE
CERTIFICATE OF CORRECTION

PATENT NO. : 4,447,403

DATED : May 8, 1984

INVENTOR(S) : Laurence W. Bierman et al.

It is certified that error appears in the above-identified patent and that said Letters Patent is hereby corrected as shown below:

IN THE TITLE

After "SPECIES" insert --IN--.

Signed and Sealed this

Sixteenth Day of October 1984

[SEAL]

Attest:

GERALD J. MOSSINGHOFF

Attesting Officer     Commissioner of Patents and Trademarks